June 10, 1952      J. P. BARKDOLL      2,599,537
ADJUSTABLE MARGIN REGULATING MEANS FOR TYPING MACHINES
Filed May 5, 1950
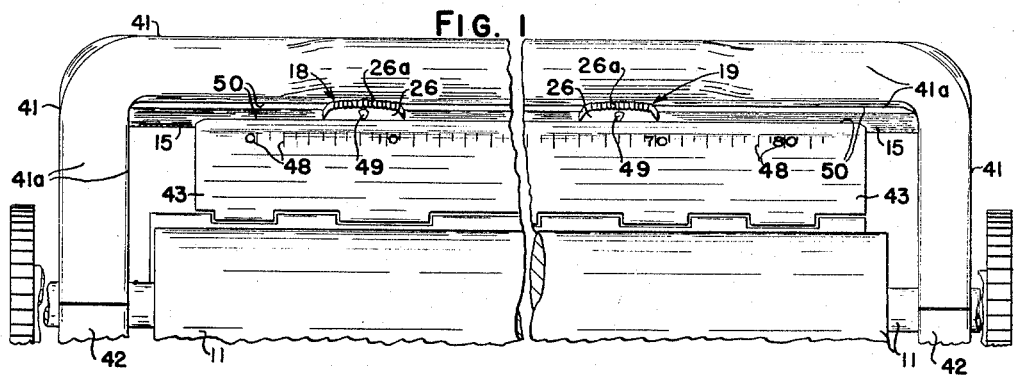
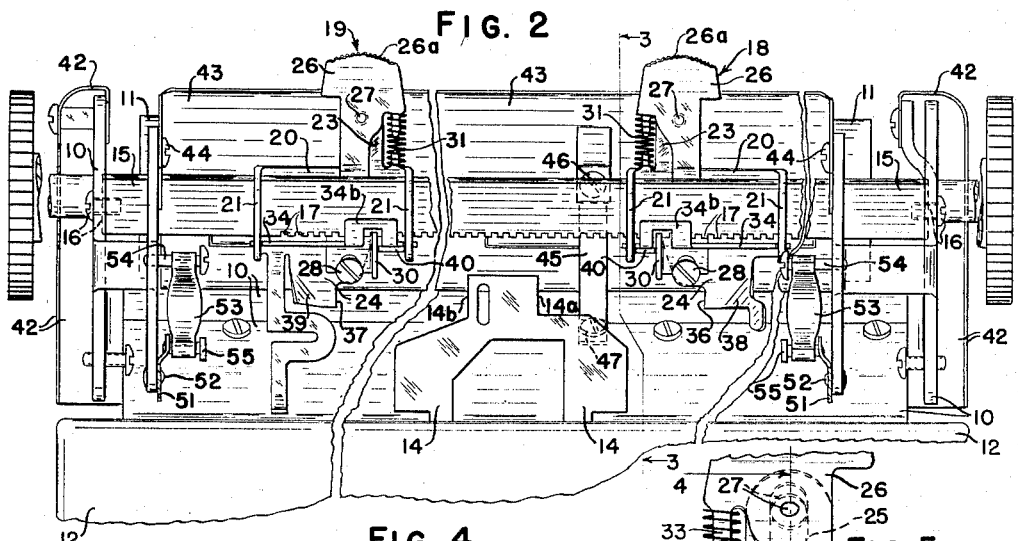
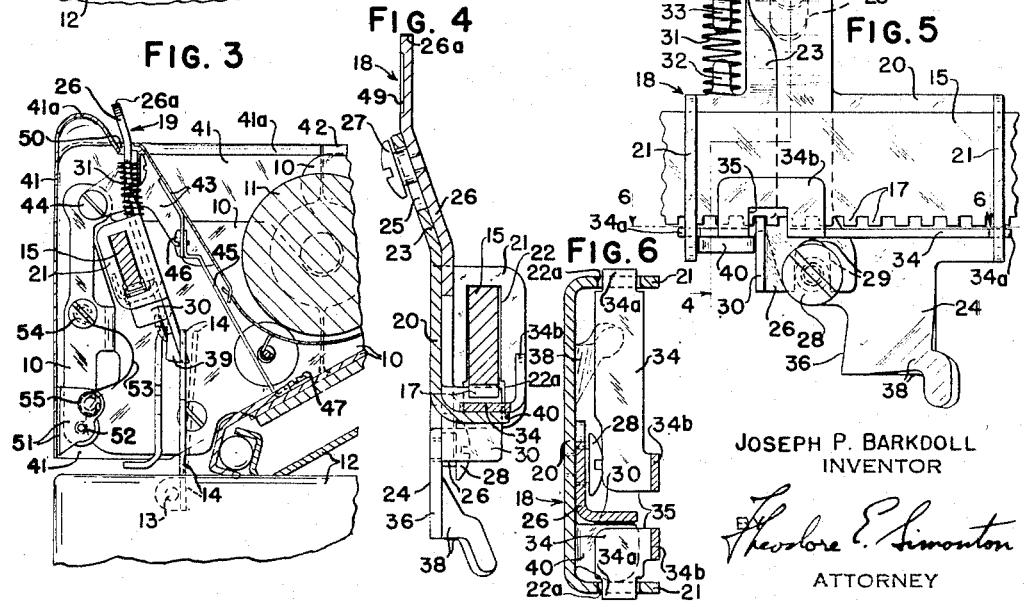
JOSEPH P. BARKDOLL
INVENTOR
ATTORNEY Patented June 10, 1952

2,599,537

UNITED STATES PATENT OFFICE 2,599,537

ADJUSTABLE MARGIN REGULATING MEANS FOR TYPING MACHINES

Joseph P. Barkdoll, Groton, N. Y., assignor to L. C. Smith & Corona Typewriters, Inc., Syracuse, N. Y., a corporation of New York Application May 5, 1950, Serial No. 160,317

10 Claims. (Cl. 197—63)

The invention relates to improvements in adjustable margin regulating means for typing machines.

The principal purposes of the invention are to provide improved adjustable margin regulating means wherein two adjustable stops for regulating the widths of right and left hand margins respectively of typed matter may be located on the platen carriage of a typewriting machine adjacent the rear of the machine and be quickly and easily selectively adjusted by a typist seated in typing position in front of the machine; to provide at the rear of a typewriting machine carriage a substantially completely concealed assembly of a stop bar and margin stops thereon wherein the stops of said assembly may be selectively manually adjusted with ease and rapidity by the typist while seated in front of the machine; to provide an improved form of margin stop of extremely simple and cheap construction which will act effectively to arrest the carriage and may be easily and quickly released from, adjusted along, and relatched to a margin stop bar; and to provide an improved assembly of margin stops and toothed margin stop bar wherein stops formed principally of thin and inexpensive stock are readily adjustable on the bar and will not become deformed by carriage arresting shocks.

Other purposes and advantages of the invention will appear from the following description in detail of the preferred embodiment of the invention shown by way of example in the accompanying drawing.

In the drawing:

Figure 1 is a fragmentary top plan view of a known typewriting machine equipped with improvements embodying the invention;

Figure 2 is a fragmentary rear view of the machine with a hinged carriage masking part hereinafter described broken away;

Figure 3 is a vertical sectional view of the machine on the line 3—3 of Figure 2;

Figure 4 is a detail sectional view on the line 4—4 of Figure 5;

Figure 5 is an enlarged fragmentary rear view of the left hand margin defining stop and the portion of the stop bar extending therethrough; and Figure 6 is a detail sectional view on the line 6—6 of Figure 5.

Only so much of the known machine has been shown and will be described as is necessary for a clear understanding of the invention by those skilled in the art.

The known machine has a platen carriage 10 which carries a roller platen 11 and travels from right to left over the rear of the usual main stationary portion 12 of the machine in typing a line and is returnable from left to right to begin a new line. Substantially midway between the sides of the machine, and pivoted to swing fore and aft of the machine on a horizontal pivot 13 on portion 12 of the machine, is a counter stop 14 for coaction in known manner with right and left hand margin regulating stops mounted on the carriage.

The improvements now will be described.

According to the present invention, a flat metal margin stop bar 15 extends horizontally longitudinally of the carriage behind the platen and is secured at its ends at 16 to the carriage, said bar having its lower edge serrated entirely thereacross to provide square teeth 17 spaced a letter-space distance apart. This bar carries two improved margin stops 18 and 19 for regulating the widths of the left and right hand margins, respectively, of matter typed with the improved machine.

Each margin stop comprises a sheet metal stop body having a flat bar-like main portion 20 formed at its ends with two supporting ears 21 bent at a right angle thereto which ears are each provided with a closed slot 22 through which the stop bar extends with a loose fit around the top and both faces of the bar from the top of the bar to approximately the roots of the bar teeth. Slot 22 has a widened lower end portion 22$^a$ which extends below the toothed edge of the bar, said slot being widened uniformly at both sides thereof to form slot portion 22$^a$, the slot thus being of substantially inverted T-shape.

The body part 20 of each stop is provided between its ears 21 and respectively above and below the stop bar with an upwardly extending flat projection or extension 23 and a downwardly extending flat projection or extension 24, the extension 23 being formed with a closed vertical slot 25. Each stop has a sheet metal latch 26 loosely held to the extensions 23 and 24 of the stop body with the latch disposed flatwise to said extensions and the stop body at the rear of the stop body and guided to reciprocate down and up out of and into latched engagement with the toothed lower edge of the stop bar. Each latch 26 has an upper end edge or finger-contact end 26$^a$ preferably upwardly arched and serrated between the side edges of the latch as shown. A shouldered guide screw 27 threaded into latch 26 has its shouldered portion guided in slot 25, and a shouldered guide screw 28 threaded in the stop body extension 24 has its shouldered portion engaged in a vertical guide slot 29 in the lower end of latch 26. The shouldered portions of the screws are long enough to permit limited fore and aft play between the latch and stop body, as shown in Figure 4. Each latch has at its lower end at one side edge thereof a vertically disposed latch lug or nose 30 extending rearward under the rack at a right angle to the rack and normally engaged at its upper end in a tooth space of the rack to hold the stop against movement along the stop bar. Each stop latch is normally yieldingly pressed upward into latching position by a helical latch spring 31 the upper and lower end portions of which surround lugs 32 and 33 extending respectively upward and downward from the stop body part 20 and the latch, respectively.

Each margin stop also comprises a sheet metal guide shoe 34 supported by the stop body immediately below the toothed edge of the rack for limited universal floating or tilting movement relatively to the stop bar and the stop body, the stop bar coacting with the stop body to hold the shoe assembled with the body. Shoe 34 is a flat sheet metal bar having reduced end portions 34ª extending loosely through parts 22ª of slots 22 in ears 21 and normally seated flatwise on the lower end edges of the slots with the upper flat face of the shoe slightly out of contact with the toothed bottom edge of the stop bar 15. The shoe is formed at its rear edge with an upturned lug 34ᵇ and is also formed with a transverse slot 35 extending across the shoe from the front edge of the shoe up into lug 34ᵇ to a point above the bar teeth to afford clearance for the nose 30 of latch 26.

The two margin stops are of substantially identical construction except that the latches are located adjacent the inner ends of the stops and that the part 24 of stop 18 has a stop edge 36 facing toward the counterstop 14 and the part 24 of stop 18 has a stop edge 37 facing toward the counterstop. Edge 36 of stop 18 abuts a stop edge 14ª of stop 14 to arrest the carriage and edge 37 of stop 19 abuts a stop edge 14ᵇ of stop 14 to arrest the carriage. Parts 24 of stops 18 and 19 have an outwardly facing cam portion 38 on stop 18 and an outwardly facing cam portion 39 on stop 19 to cam stop 14 forwardly about pivot 13 to permit the respective stops 18 and 19 to return past stop 14 following margin release operations as is common in the art.

Each margin stop 18 and 19 has its body part 20 formed at its lower edge and adjacent the inner end of the stop with a bracing lug or abutment 40 for nose 30 of its latch 26, said lug extending flatwise and rearward under guide shoe 34 of the stop between, and in contact at opposite edges of the lug with, the opposed faces of nose 30 and the adjacent ear 21 formed on part 20.

Depression of the latch 26 of each stop is positively arrested, with nose 30 of the latch moved downwardly clear of the teeth 17 of the stop bar 15, by reason of the engagement of the upper end of guide slot 29 in the latch with the shouldered portion of guide screw 28 on the stop body. Upward movement of the latch into latching position is, of course, arrested by engagement of nose 30 with bar 15 in a tooth space of the bar. Slot 25 in extension 23 of the stop body is of such length that neither the upper or lower end thereof is engaged by guide screw 27 on the stop latch in the latching and unlatching movement of the latch.

Means are provided on the carriage 10 to house and substantially completely conceal from view the margin stops 18 and 19 and the stop bar 15 and its connections with the carriage, said means being constructed and arranged to permit selective setting of stops 18 and 19 while said stops and the stop bar are so housed and concealed from view by said means which now will be described.

A sheet metal masking wall 41 of substantially U-shape in plan extends behind the rear of the carriage and forwardly at each end of the carriage with its forwardly extending end portions abutting one or more parts 42 of the carriage, said wall having around its upper edge an inturned flange 41ª. At the rear of the platen 11 and within the space enclosed by said wall 41 there is fixed to the carriage a paper feed table 43 inclined downward and forward toward the bottom of the platen. Screws 44 hold this table to the carriage, and the table is further held to the carriage by a bracket arm 45 and screws 46 and 47 connecting said arm to the table and carriage respectively.

The upper edge of the table is straight and extends parallel to the stop bar and the forwardly and upwardly directed face of the table has a letter space scale 48 printed or otherwise formed thereon along the upper edge of the table. Each margin stop has its latch 26 provided with a setting indicating mark 49 printed or otherwise formed on the front face of the latch adjacent the upper end of the latch for coaction with scale 48 to indicate the letter space setting of the respective margin stops 18 and 19. Flange 41ª of wall 41 has a straight formed edge portion extending parallel to and immediately adjacent the upper edge of the paper table to provide a straight and narrow gap 50 therebetween affording clearance for up and down movement of the upper ends of the latches and for movement of the said ends of latches longitudinally of the carriage throughout the ranges of adjustment of the stops 18 and 19 on bar 15. The upper ends of the latches project up through gap 50 in both the latching and releasing positions of the latches for engagement of the top edges 26ª of the latches by a finger of the typist to selectively set the stops 18 and 19.

Wall or mask element 41 has hinge brackets 51 fixed thereto and hinged to the carriage on horizontal pivots 52 so that said wall may be swung downward and rearward when desired to afford access to parts of the machine. Bowed over-center leaf springs 53 are pivoted at their ends to the carriage by horizontal pivots 54 and to the hinge brackets 51 on wall 41 by horizontal pivots 55. Pivots 55 pass between pivots 54 and 52 during swinging of said wall, and springs 53 normally yieldingly hold said wall in the masking position shown, and also serve to limit downward and rearward swinging of the wall.

Either stop 18 or 19 may be set in a desired new position by the typist merely by depressing the exposed upper end of the latch of that stop with one finger to unlatch the stop, then shifting the finger to the right or left while maintaining light downward pressure on the latch until the mark 49 on the latch registers with the desired letter space graduation mark of scale 48, and finally removing the finger from the latch to permit the latch automatically to re-engage the bar and latch the stop in the selected letter space position. In some cases the carriage will, of course, have to be moved to permit the stop to be moved to the selected position. Also the carriage can be moved with one hand to the selected letter space position while the stop is held stationary in unlatched position by downward pressure of a finger of the other hand on the latch, instead of shifting the released stop along the stop bar by lateral movement of the finger engaged with the latch.

The stops 18 and 19 are formed of light and loosely assembled parts constructed and arranged for latching and unlatching of the stops with very light forces and for relative sliding of the stops and rack longitudinally of the rack with very light forces and without liability of the stops binding on the stop bar or any part thereof catching in the rack teeth while the stops are being adjusted along the rack.

The lug 40 on each stop backs up the nose of the latch of that stop when the stop collides with the counterstop to arrest the carriage, and said lug 40 is, in turn, backed up by the adjacent ear 21 of the stop, so that bending of the nose 30 of the stop and injurious strain on the latch guiding screws under carriage arresting shock are prevented. Lug 40 also assists in guiding the latch during latching and unlatching movements of the latch.

The guide shoe 34 and its reduced ends 34ª project beyond both faces of the stop bar and prevent the ears 21 from catching in the teeth of the bar. The body of either stop 18 or 19 may tilt slightly relatively to the bar during adjustment of the stop under the influence of finger pressure on the stop latch, but the shoe 34 will tilt with the stop body and glide smoothly along the toothed edge of the stop bar. Leftward pressure on the latch will tilt the guide shoe downward at the left end thereof away from the toothed edge of the bar and tilt the right or trailing end of the shoe up toward the toothed edge of the bar. Rightward adjusting pressure on the stop latch will reverse the above described tilting of the guide shoe. The stop bar and stop body prevent tilting of the shoe far enough in any direction to disengage the shoe from the stop body. The ears 21 prevent disengagement of the reduced ends 34ª of the shoe from the stop body by endwise movement of the shoe.

The counterstop 14 of the known machine is rockable forwardly by known margin release means (not shown) into the position shown in dotted lines in Figure 3 to permit either of the stops 18 or 19 to move past stop 14 when it is desired to type within the selected margins of a sheet. The cam portions 38 and 39 of stops 18 and 19 act to cam stop 14 forwardly to permit the stops 18 and 19, respectively, to pass back past the counterstop.

Preferably, as shown, the construction and arrangement of parts 41 and 43 are such that gap 50 and the scale 48 together with the upwardly protruding ends of the margin stop latches 26 are located above the horizontal level of the highest part of the platen 11 for maximum visibility of said scale and stop latch ends to a typist seated in front of the machine and maximum ease of setting of the margin stops by the seated typist.

I claim:

1. A typing machine having, in combination, a stationary main part, a platen carriage extending and reciprocable transversely of the machine over said main part, a margin stop bar extending transversely of the machine and held to the carriage and having a downwardly facing toothed edge, a sheet metal margin stop having a fore and aft facing main body part and two opposed and parallel end ears normal to said body part, said ears each having an aperture through which said bar extends for supporting the stop for sliding adjustment along the bar, a sheet metal latch facing said body part of the stop and slidably held thereto for up and down reciprocation, said latch having a stop latching lug adjacent the lower end thereof facing said ears and disposed edgewisely of the lug under said bar, a spring engaged with said stop and latch to urge the latch upward and engage the latching lug in a selected tooth space of the toothed edge of the bar, said latch having a finger-contactive upper end above said stop and bar for depression of the latch to release the stop, said stop having a bracing lug for said latching lug extending flatwise under the toothed edge of the bar and in edge contact with one face of said latching lug and one face of one of said stop ears, said stop having a pendant portion below the bar having an abutment face facing in the same direction as said one face of said latching lug, and a counterstop on said main part of the machine for abutment by said abutment face of said pendant part of the stop to arrest movement of the carriage in one direction of its reciprocation.

2. A typing machine, as claimed in claim 1, having a sheet metal guide shoe for said stop loosely underlying the toothed edge of said bar at opposite sides of the latching lug and having an intermediate portion affording clearance for said latching lug for latching and unlatching movements of the latch, said shoe having reduced end portions extending through the apertures in the ears of said stop and having shoulders at the inner ends of said reduced portions abuttive with said ears to maintain said reduced end portions engaged in said ears while the stop is mounted on the bar.

3. A typing machine, as claimed in claim 2, having means mounted on the carriage substantially entirely concealing the stop bar and stop and affording a narrow clearance gap for the stop latch above said bar and stop and below the upper end of the latch, which gap extends longitudinally of the bar and throughout the field of adjustment of said stop, said means and said latch having exposed cooperative indicia to indicate the respective letter space adjusted positions of the stop along said bar.

4. A typing machine, as claimed in claim 1, wherein the carriage has a roller platen mounted thereon and extending longitudinally of the bar in front of the bar, and said latch has its finger-contactive upper end located above the level of the highest part of the platen.

5. A typing machine, as claimed in claim 4, wherein a paper table is fixed to the carriage to extend downwardly and forwardly between the platen and the assembled margin stop and stop bar and has a straight upper edge below said upper end of the stop latch, and wherein said latch and paper table have cooperating indicia at the front thereof adjacent the upper edge of the table to indicate letter space adjusted positions of the margin stop.

6. A typing machine, as claimed in claim 5, having a second margin stop constructed as specified and cooperative with said counterstop to arrest movement of the carriage in the other direction of its reciprocation.

7. A typing machine having, in combination, a stationary main part, a platen carriage reciprocable transversely of the machine over said main part adjacent the rear of the machine, a roller platen journaled in the carriage, a forwardly facing paper table fixed to the carriage behind the platen and having a straight horizontal upper edge above the level of the highest part of the platen and provided along said edge with a letter space scale, a toothed margin stop bar held to the carriage and located behind said table, right and left hand margin stops slidably mounted on and adjustable along said bar behind said table, latches for said stops each movable bodily with its associated stop longitudinally of the bar and spring urged upwardly relatively to its associated stop to latch in tooth spaces of said bar and depressible to disengage from said bar, means to limit disengaging movements of the stop latch, said latches each having a finger-contactive upper end portion protruding above said upper edge of the paper table in the latching and disengaged positions of the latch and each having forwardly facing means cooperative with said scale to indicate the adjusted stop positions, a masking element extending behind said bar and stops and about the ends of the bar and paper table and having a straight upper edge extending immediately behind said stop latches substantially opposite the upper edge of the paper table, means hingedly mounting said masking element on the carriage for downward and rearward movement of said element away from the stop bar and paper table at will, and a counterstop for said margin stops which is mounted on the main part of the machine and extends upwardly into the path of movement of the margin stops.

8. A typing machine having margin regulating means comprising, in combination, a margin stop bar having a toothed face, a sheet metal margin stop having an abutment face directed toward one end of the bar for engagement with a counterstop to limit relative movement between said counterstop and the margin stop, said margin stop having end ears each provided with an aperture through which the bar extends for slidably supporting the stop on the bar, and a sheet metal latch slidably held to the stop between said ears for reciprocation edgewise of said stop and having a stop latching lug facing toward opposite ends of said bar with one edge of said lug facing the toothed face of the bar, and a spring for slidably urging said latch in a direction to engage said lug edgewise with the toothed face of said bar, said stop having a bracing lug for said latching lug of the stop latch opposed facewise to the toothed face of the bar and having its opposite edges engaged with one face of one of said stop ears and with that face of the latching lug which is directed toward the same end of the bar as that toward which the abutment face of the stop is directed.

9. A typing machine, as claimed in claim 8, having a stop guiding shoe interlocked at opposite ends thereof with said ears and extending through the ear apertures with end portions of the shoe at opposite sides of said latching lug opposed to the toothed face of the bar.

10. Adjustable margin regulating means for typing machines comprising, in combination, a sheet metal margin stop having two opposed end ears each pierced to slidably encompass a toothed margin stop bar, and a sheet metal latch for releasably engaging teeth of such bar and having a main body part slidably held to the stop for endwise latching and releasing reciprocation of the latch edgewise of the stop and having also a stop latching lug formed on and normal to said body part of the latch and extending between and parallel to said stop ears, said stop having a bracing lug for said latching lug normal to and abutting one face of said latching lug, and said stop having for engagement with a counterstop, an abutment face which faces in the same direction as said one face of said latching lug.

JOSEPH P. BARKDOLL.

REFERENCES CITED

The following references are of record in the file of this patent:

UNITED STATES PATENTS

| Number | Name | Date |
|---|---|---|
| 1,400,492 | Molle | Dec. 13, 1921 |
| 1,659,601 | Hess | Feb. 12, 1928 |
| 1,826,780 | Harmon | Oct. 13, 1931 |
| 2,295,921 | Walker et al. | Sept. 15, 1942 |